United States Patent
Kawakami

[15] 3,672,684

[45] June 27, 1972

[54] MAGNETIC RECORDING AND REPRODUCING APPARATUS

[72] Inventor: Hiroshi Kawakami, Tokyo, Japan

[73] Assignee: Sony Corporation, Tokyo, Japan

[22] Filed: Oct. 30, 1970

[21] Appl. No.: 85,555

[30] Foreign Application Priority Data

Nov. 4, 1969 Japan....................................44/88182

[52] U.S. Cl. ...............................274/4 D, 242/189, 242/201

[51] Int. Cl. ..........................................................G11b 5/00

[58] Field of Search................74/2; 274/4 D, 11 D; 242/189, 242/190, 201

[56] References Cited

UNITED STATES PATENTS

| | | | |
|---|---|---|---|
| 3,093,334 | 6/1963 | Andrews | 242/189 |
| 3,443,812 | 5/1969 | Atsumi | 274/4 D |

*Primary Examiner*—Milton Kaufman
*Attorney*—Lewis H. Eslinger, Alvin Sinderbrand and Curtis, Morris and Safford

[57] ABSTRACT

In a tape recording and/or reproducing device having a magnetic head for recording signals on and reproducing signals from a magnetic tape passing adjacent the head, in tension, from a supply reel to a takeup reel and switch control means movable to a plurality of positions for selectively determining the stop and operating modes of the device, apparatus is provided for selectively maintaining the switch control means in each of its positions. The apparatus includes means urging the switch control means to the position thereof which determines the stop mode of the device and a spring biased tape engaging lever pivotally mounted on the device for movement between first and second positions. The tape engaging lever is held in its first position by the tape as it is moved, in tension, past the magnetic head and is moved towards the second position by its spring in the absence of tensioned tape engaged therewith. A releasable locking mechanism, operably engaged between the switch control means and the tape engaging lever, holds the switch control means in a predetermined position corresponding to one of the operative modes of the device when the tape engaging lever is in its first position and for releasing the switch control means when the tape engaging lever is moved towards its second position whereby the device is automatically returned to its inoperative mode.

10 Claims, 7 Drawing Figures

INVENTOR
HIROSHI KAWAKAMI
BY
Lewis H. Eslinger
ATTORNEY

INVENTOR.
HIROSHI KAWAKAMI
BY
Lewis H. Eslinger
ATTORNEY

INVENTOR
HIROSHI KAWAKAMI
BY
Lewis H. Eslinger
ATTORNEY

MAGNETIC RECORDING AND REPRODUCING APPARATUS

This invention relates to a magnetic recording and/or reproducing device, such as for example, an audio or video tape recorder, and more particularly to a magnetic tape recording and/or reproducing device having supply and takeup reels and an automatic control system for placing the device in its inoperative or "stop" mode when the tape or the supply reel is exhausted.

Magnetic recording and/or reproducing devices of the above type have previously been proposed in which a special metallic tape or leader is provided at one or both ends of the supply of tape to cooperate with an electronic detecting device, such as a solenoid, which is energized by the metallic leader and operates a control switch on the device to stop the device and place it in its inoperative mode. It has also been proposed that photoelectric control devices be positioned adjacent the magnetic recording head to determine when the end of the tape has passed the head and operate a power switch or the like to return the device to its inoperative mode. Such previously proposed control devices, while generally satisfactory, have required relatively complicated equipment to perform the desired operation and in addition are relatively expensive to produce.

Accordingly, it is an object of the present invention to automatically return a magnetic tape recording and/or reproducing device to its inoperative mode at the end of the tape supply utilized in the device.

It is another object of the present invention to provide an automatic stopping system for a magnetic tape recording and/or reproducing apparatus which is both simple and inexpensive in construction.

It is another object of the present invention to hold the control switch of a magnetic tape recording and/or reproducing apparatus in a preselected position, corresponding to an operating mode of the apparatus and return the switch to the position thereof corresponding to the stop mode when the tape supplied to the apparatus has run out.

It is still another object of the invention to provide an automatic stop system for a magnetic tape recording and/or reproducing device which is relatively compact in construction and simple in operation.

In accordance with an aspect of this invention, a magnetic tape recording and/or reproducing device having a magnetic head for recording signals on and reproducing signals from a magnetic tape passing adjacent the head, in tension, from a supply reel to a takeup reel, and a switch control member movable to a plurality of positions for selectively determining the stop and operating modes of the device, is provided with automatic control apparatus for selectively maintaining the switch control member in each of these respective positions. The automatic control apparatus for maintaining the switch in a preselected position includes means urging the switch control member to the position thereof which determines the stop mode of the device. A tape engaging means is mounted on the device for movement between first and second positions therein and is spring biased towards its second position. The tape engaging means is held in its first position by the tape as it moves, in tension, past the magnetic head and is moved towards the second position by its spring biasing member in the absence of tensioned tape engaged therewith. At the end of the tape on the supply reels, the tape end passes the tape engaging means and thus the spring biasing member connected to the tape engaging means moves the latter towards its second position. A releasable locking mechanism is operatively engaged with the tape engaging means and the switch control member to hold the latter in a preselected position corresponding to an operative mode of the device when the tape engaging means is at its first position. The releasable locking mechanism releases the switch control member when the tape engaging means is moved towards its second position, whereby the switch control member is returned to the stop position, corresponding to the stop mode of the device, by said urging means.

According to one embodiment of the present invention the switch control member is operably connected to a cam having a plurality of recesses formed on the peripheral surface thereof, which recesses correspond respectively to the various switch positions. A latching member is mounted in the device for selectively engaging the cam recesses and is urged into the recesses corresponding to the operative modes of the device by a spring device with a greater force than at the cam recess corresponding to the stop mode. A spring biased cam follower is engaged with a surface portion of the cam member and continuously urges the cam into a position wherein the latching member is engaged with the cam recess corresponding to the stop mode of the device.

The releasable locking mechanism is operably engaged between the tape engaging means and the latching member and increases the forces applied by the spring device of the latching mechanism when the tape engaging means is at its first position to overcome the force applied to the cam by the cam follower and thus holds the latching mechanism in the cam recess corresponding to the preselected operating mode of the device. The releasable locking mechanism reduces the force applied by the spring device of the latching mechanism when the tape engaging means is moved towards its second position, and this reduced force is overcome by the force applied to the cam by the cam follower to automatically return the cam and thus the switch control member to the stop position wherein the device is placed in its inoperative or "stop" mode.

The above, and other objects, features and advantages of this invention, will be apparent in the following detailed description of illustrative embodiments thereof, which are to be read in connection with the accompanying drawings, wherein.

Figures 1, 2, 3:
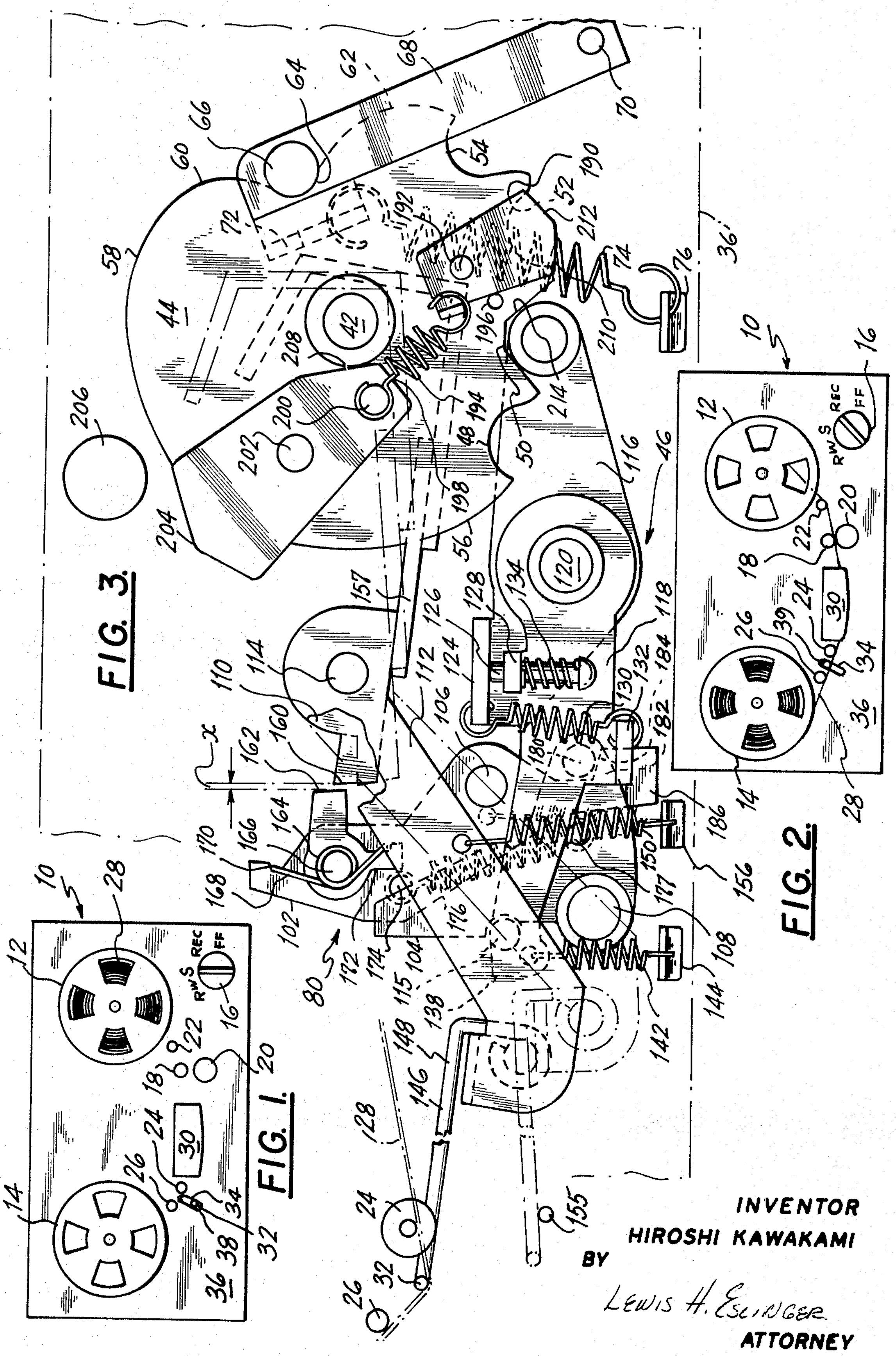
FIG. 1 is a plan view of a magnetic tape recording and/or reproducing apparatus in which the present invention may be employed and illustrates the configuration of the device in its stop mode.
FIG. 2 is a plan view similar to FIG. 1 illustrating the configuration of the apparatus in its record mode immediately prior to release of the end of the tape on the supply reel.
FIG. 3 is a plan view of the automatic control apparatus according to one embodiment of the present invention and illustrates the configuration thereof when the device is in its stop mode and shows the first and second positions of the tape engaging mechanisms in solid and phantom lines respectively.

Referring to the drawings in detail, and initially to FIG. 1 thereof, it will be seen that a magnetic tape recording and/or reproducing device 10 including the present invention, as shown therein, has a supply reel 12 and a takeup reel 14 rotatably mounted thereon. Supply and takeup reels 12 and 14 are driven in a conventional manner by a motor (not shown) and the direction and speed of rotation of the reels is determined by conventional switching apparatus (not shown) which is controlled by manually operated dial 16.

In magnetic tape recording and/or reproducing device 10, dial 16 may be positioned for fast forward, record, stop or rewind as indicated by the legends adjacent the dial in FIG. 1. In FIG. 1 the dial is located at its stop position and the device 10 is in its inoperative mode.

In addition, magnetic recording and/or reproducing device 10 is provided with a capstan 18 and pinch roller 20, the latter being moved into engagement with capstan 18 by a mechanical linkage (not shown and which forms no part of the present invention) when dial 16 is placed in its record position. Further, guide rollers 22, 24, and 26 are provided to guide the tape 28 from supply reel 12 past magnetic recording and reproducing head 30.

A tape engaging member, or bar, 32 is provided in device 10 and extends through slot 34 in deck 36 of the device for engagement with tape 28 as it passes adjacent magnetic head 30. As seen in FIG. 1, in the stop mode of the apparatus the tape engaging bar 32 is positioned adjacent edge 38 of slot 34.

Referring now to FIG. 2 of the drawings, there is illustrated the configuration of magnetic tape recording and/or reproducing device 10 during operation thereof. In this case dial 16 is located at its record position and tape 28 is drawn from supply reel 12 towards takeup reel 14. Pinch roller 20 has been moved into position adjacent capstan 18 and tape engaging bar 32 has been moved towards edge 39 of slot 34. It is noted that tape engaging bar 32 is moved manually to its position adjacent slot edge 39 by the operator at the beginning of the operation of the device and manually held there while tape 28 is threaded past rollers 22, 24 and 26 towards takeup reel 14, and is then held in that position by engagement with the tape after the latter is secured to reel 14.

Figure 4:
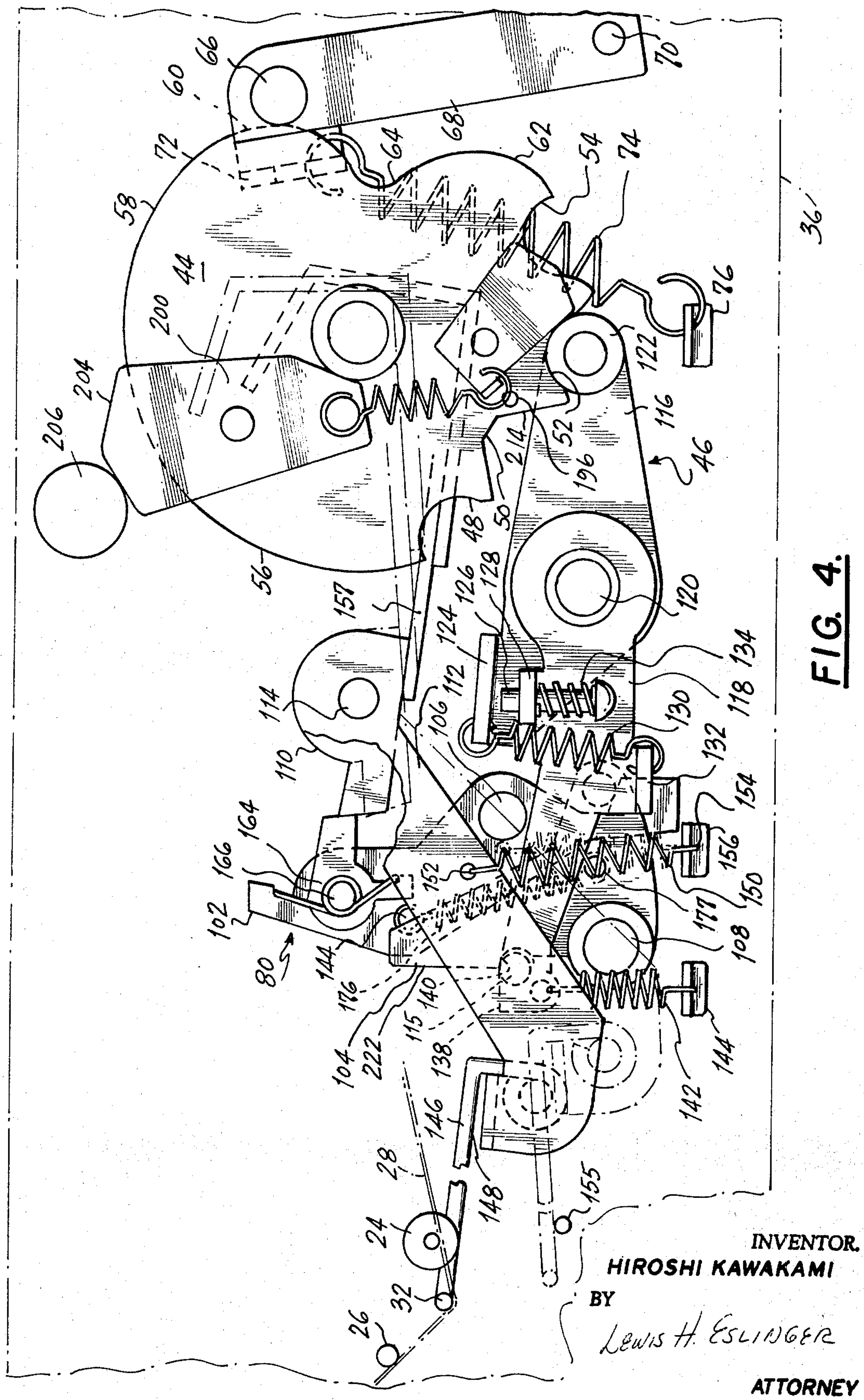
FIG. 4 is a plan view similar to FIG. 3 illustrating the configuration of the automatic control apparatus when the tape recording and/or reproducing device is in an operating mode thereof.

Dial 16 is rigidly mounted on a shaft 42, which extends downwardly below deck 36, as illustrated in FIGS. 3 and 4. These Figures illustrate one embodiment of the automatic control apparatus 40 for dial 16, and the deck 36 (shown in phantom) and dial 16 have been removed therefrom for clarity. However, it should be clear that shaft 42 extends upwardly from the drawing for connection to the dial 16.

Automatic control apparatus 40 includes a cam member 44 secured to shaft 42 for rotation therewith, which cam cooperates with a latching mechanism 46 adapted to hold dial 16 in a preselected position corresponding to an operating mode of device 10. Cam 44 includes a plurality of recesses, on the peripheral edge 56 thereof, which recesses correspond to the various positions of dial 16, that is, recess 48 corresponds to the rewind position, recess 50 to the stop position, recess 52 to the record and reproducing position, and recess 54 to the fast forward position. Of course, it is contemplated that the device 10 may have other desired modes of operation and that accordingly other recesses may be provided on cam 42. As shown in FIG. 3 latching mechanism 46 is engaged in recess 50 and dial 16 is located at its stop position wherein the device is in its stop or inoperative mode.

Cam 44 also includes a control edge or surface portion 58 having a pair of convex sections 60 and 62, with a concave portion 64 therebetween. A cam follower or roller 66 is provided on a lever 68, the latter being pivotally mounted on the lower surface of deck 36 by a pin 70. Lever 68 includes an extension portion 72 to which a spring 74 is connected for biasing lever 68 and thus cam follower 66 into engagement with the surface 58 of the cam. Spring 74 is secured at its other end to a projection 76 mounted to a base plate positioned below control apparatus 40 and which has not been shown for the sake of clarity in the drawings.

When latching mechanism 46 is engaged in recess 50 cam follower 66 is positioned in concave portion 64 of cam surface 58 and cam 44 is held in this position under the influence of spring 74. When shaft 42 is rotated, as for example, when an operator rotates dial 16, cam follower 66 will be engaged with either surface portion 60 or 62 of the cam, depending on the direction of rotation of the dial. In either of these positions, cam follower 66, under the influence of spring 74, urges cam 44 back to its original position wherein the cam follower is within concave portion 64 and latching mechanism 46 is engaged with recess 50. This arrangement of lever 68 and spring 74 provides for the automatic return of the dial 16 to its stop position and thus the automatic return of the device to its stop mode. However, when dial 16 is moved to one of its positions corresponding to an operating mode of the apparatus, it is necessary to overcome the biasing forces of spring 74 to hold cam 44 in the selected position. This is achieved by the provision of a releasable locking mechanism 80 which cooperates with tape engaging bar 32 and latching mechanism 46 to hold cam 44 in the desired position while bar 32 is engaged with tape 28 passing adjacent magnetic head 30 under tension from supply reel 12 to takeup reel 14.

Figures 5, 6, 7:
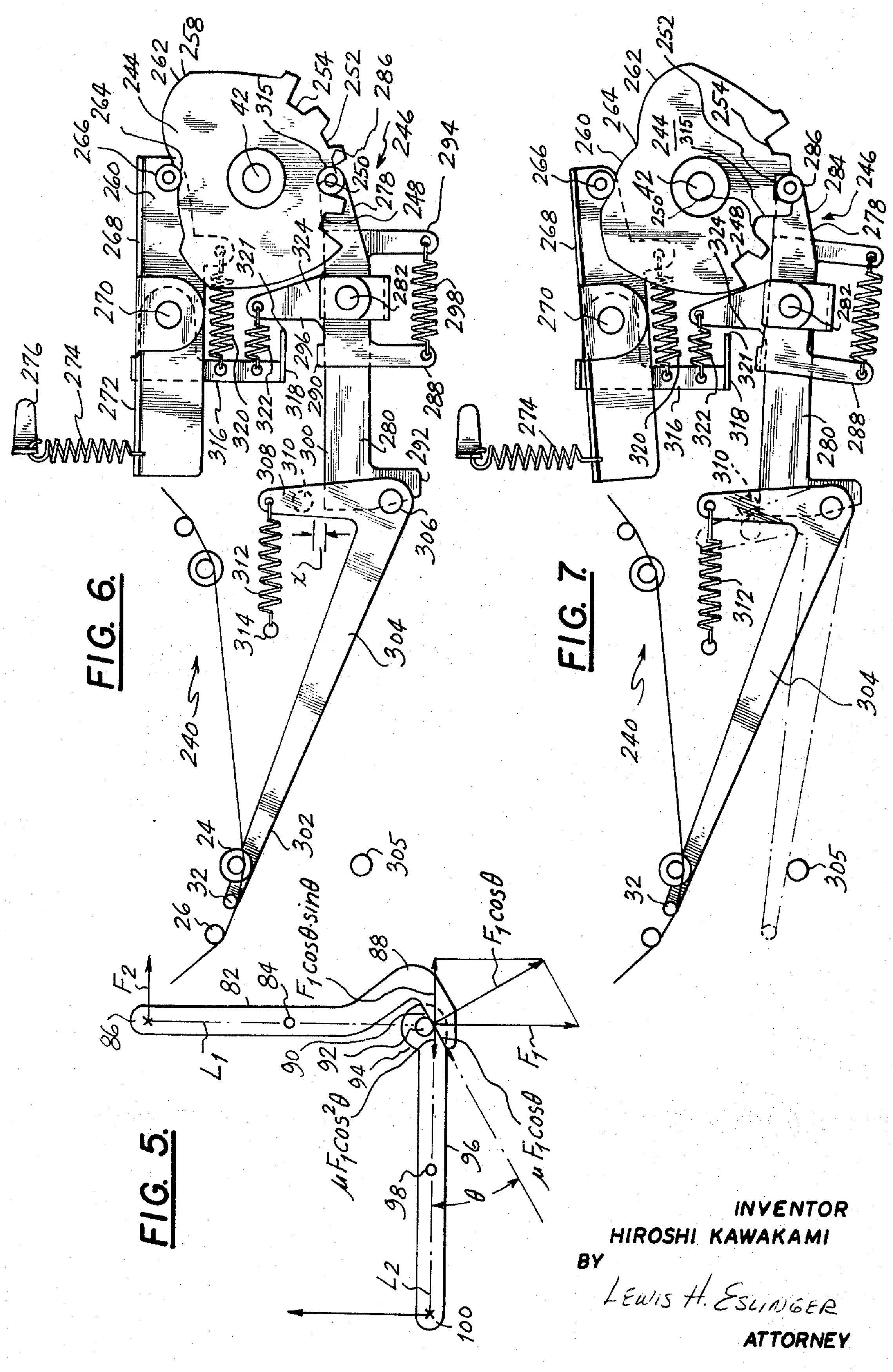
FIG. 5 is a schematic diagram illustrating the principles of operation of the mechanism shown in FIGS. 3 and 4.
FIG. 6 is a plan view, similar to FIG. 3, of another embodiment of the present invention and illustrates the configuration thereof in the stop mode.
FIG. 7 is a plan view similar to FIG. 6 illustrating the configuration of the apparatus in an operating mode of the device.

To facilitate understanding of the operation of releasable locking mechanism 80, a schematic diagram is shown in FIG. 5 which illustrates the principles of operation of the locking mechanism. As seen therein, a lever 82 is provided which is pivotally mounted on pin 84 and has force $F_2$ applied at the end 86 thereof. The opposed end 88 of lever 82 includes an inclined surface 90 which is engaged with a pin 92 secured to the end 94 of a lever 96. The latter is pivotally mounted on pin 98 and has a force $F_1$ applied to the end 100 thereof. As seen in the drawings, forces $F_1$ and $F_2$ tend to rotate their respective levers in a generally clockwise direction, however, force $F_2$ applies a reaction force to pin 92 which tends to overcome the tendency of force $F_1$ to rotate lever 96. By providing properly balanced forces $F_1$ and $F_2$ it is seen that lever 82 will effectively lock lever 96 against clockwise rotational movement about pin 98.

The force $F_1$ applied to pin 92 has been resolved, as illustrated in FIG. 5, into the various components thereof and in addition the frictional force produced by the engagement of surface 90 with pin 92 is indicated. Utilizing these forces it can be proved by elementary trigonometry and statics that if the horizontal components of $F_1$ applied at pin 92 are equal to the force $F_2$, in accordance with the equation $F_2 = F_1 \cos\theta (\sin\theta - \mu \cos\theta)$ then levers 82 and 96 will be balanced and locked in position with respect to one another.

In the present construction of the apparatus the components thereof are formed of metal and therefore the coefficient of friction $\mu$ will be approximately 0.25. If the angle theta ($\theta$) formed by surface 90 with respect to a line $L_2$ passing between the point of application of force $F_1$, pin 98, and the point of contact of pin 92 and surface 90 is chosen to be 30°, then according to the above equation when force $F_2$ is equal to approximately one-third of $F_1$, the levers 82 and 96 will be balanced and held in a static condition. Thus, if force $F_2$ is reduced below this level, the balance condition is broken, and lever 96 will be released and permitted to rotate in a generally clockwise direction about pin 98.

Returning again to FIG. 3, it will be seen that releasable lock mechanism 80 includes a pair of levers 102 and 104 corresponding respectively to levers 82 and 96 discussed above. Lever 102 is pivotally mounted on a pin 106 secured to the base plate (not shown) and lever 104 is likewise pivotally mounted on pin 108. The force $F_2$ applied to lever 102 is provided by a stop member 110 which is secured to an arm 112, the latter being pivotally mounted on the base plate by a pin 114. The force $F_1$ applied to lever 104 is provided by engagement of that lever with a pin 115 mounted on latching mechanism 46.

Latching mechanism 46 is formed of a pair of levers 116 and 118, mounted pivotally in superimposed relation on pin 120. Lever 116 includes a roller 122 which is adapted to engage the recesses 48–54 on the peripheral surface 56 of cam 44. In addition, lever 116 includes an upstanding abutment portion 124 which is adapted to engage an abutment pin 126 threaded in an upstanding portion 128 of lever 118. Levers 116 and 118 are biased towards each other and abutment portion 124 is biased into engagement with pin 126, by a spring 130, which tends to rotate levers 116, 118, in opposite directions on pin 120 and is engaged between upstanding member 124 of lever 116 and an upstanding extension 132 on lever 118. The relative positions of levers 116 and 118 are determined by the position of screw 126, as is the tension applied to the levers by spring 130. This spacing and tension may be adjusted by rotating screw 126, and the latter is held in the desired position by a spring 134 which serves to lock the threads of the screw against the threads formed in upstanding portion 128.

When latching mechanism 46, and thus roller 122, is engaged in recess 50 of cam 44, that is, when the device is in its stop mode, pin 126 engages abutment member 124 and the minimum tension applied to lever 116 and latching mechanism 46 by spring 130 is produced.

The free end 138 of lever 118 includes pin 115 rigidly secured thereto and the latter extends downwardly therefrom for engagement with cam surface 140 on lever 104. A spring 142 is operably connected between end 138 of lever 118 and an upstanding member 144 on the base plate for returning pin 114 into engagement with cam surface 140 after locking mechanism 80 is released, as is more fully described hereinafter.

As mentioned, tape engaging bar 32 extends upwardly from below deck 36 into engagement with tape 28. The bar 32 is an integral portion of a horizontally extending bar 146 secured at its end 148 to lever 112. When the magnetic tape recording and/or reproducing device is in its stop mode, bar 32 is not engaged with tape 28 and the bar assumes a second position illustrated in phantom lines in FIGS. 3 and 4 under the influence of spring 150 connected at one end 152 to lever 112 and at its other end 154 to an upstanding member 156 on the base plate. The location of lever 112 in its second position is defined by a stop pin 155 which engages bar 146 and limits counterclockwise rotation thereof under the influence of spring 150. Rotation of lever 110 is counterbalanced by an arm 157 secured thereto which extends toward cam 44 on the opposite side of pivot pin 114.

Prior to rotating dial 16 to one of the positions thereof corresponding to an operating mode of the device, bar 32 is moved to its solid line position, as shown in FIGS. 3 and 4, and tape 28 is threaded from supply reel 12 adjacent magnetic head 30 to takeup reel 14. When the tape is thus threaded, it is in tension and the tension provided thereby holds bar 32 and lever 112 in the solid line position. Since stop member 110 is rigidly secured to lever 112 it also moves from its dotted line position to its solid line position. In this configuration the automatic control apparatus 40 is ready for operation and dial 16 may be turned to a preselected position thereof.

Prior to turning dial 16 and when apparatus 40 is in the configuration shown in FIG. 3, the abutment surface 160 of stop member 110 is spaced by a distance, indicated by X in the drawings, from the stop surface 162 of a stop lever 164 pivotally mounted by pin 166 on lever 102. Lever 164 is held in the position illustrated in the drawings by coil spring 168 which cooperates between an edge 170 of lever 102 and the leg 172 of the lever itself. Clockwise pivotal movement of the lever is limited by engagement of leg 172 with a pin 174 secured to the lever. However, lever 164 is free to pivot in a counterclockwise direction for purposes more fully described hereinafter.

Lever 102 is pivotally interconnected with lever 104 by a coil spring 176 which is operatively connected between pin 174 on lever 102 and pin 177 on lever 104 so as to normally urge both levers in a generally clockwise direction about their respective pivot pins 106 and 108. This spring serves to return the levers to the configuration illustrated in FIG. 3 after latching mechanism 46 is released and dial 16 returned to its stop position, as is also more fully described hereinafter.

Lever 104 includes a depending pin 180 secured to the leg 182 thereof, which pin engages cam surface 184 on leg 186 of lever 102. Pin 184 corresponds to the pin 92 previously discussed with respect to the schematic illustration in FIG. 5.

With bar 32 engaged with tape 28, the apparatus is, as mentioned, ready for selection of the operative mode of the device by the operator and for turning of dial 16 to its preselected and predetermined position. Thus, for example, should the operator desire to record on the tape threaded through the device, dial 16 is turned to the record position thereof. As this occurs, shaft 42 is rotated, as is cam 44, and roller 122 is moved out of engagement with recess 50 and into engagement with recess 52.

A lever 190 is pivotally mounted by pin 192 on cam 44 and overlays recess 52. Lever 190 is spring biased in a counterclockwise direction by spring member 194 and the pivotal movement thereof about pin 192 is limited by a stop pin 196 on the surface of cam 44. Spring 192 is connected at its opposed end 198 to a lever 200 pivotally mounted on a pin 202 also secured to the surface of cam 44. Lever 200 includes a cam surface 204 which is adapted to engage a roller 206, the latter being operatively connected to the mechanical linkage (not shown) which moves pinch roller 20 into engagement with capstan 18 when the device is placed in its recording mode. Lever 200 is not pivoted about shaft 202 upon engaging roller 206 since the surface 208 of lever 200 engages shaft 42 and movement of the lever is prevented; rather, roller 206, which is movably mounted in the device, is displaced to operate the above-mentioned mechanical linkage when it is engaged by the cam surface 204.

As cam 44 is rotated, and recess 52 is moved towards roller 122, the latter engages the edge 210 of lever 190 and pivots the lever in a counterclockwise direction about its pin 92 to free recess 52 for engagement with roller 122. Lever 190 is provided, so that in the event the dial 16 is rotated to the fast forward position thereof, and recess 54 is engaged with roller 122, when the device is returned to its stop position, roller 122 merely rides over the surface 212 of the lever without moving into recess 52.

Continuing now with the description of the movement of the elements, when cam 44 is rotated to engage roller 122 with recess 52, the engagement of roller 122 with the inclined surface 214 of recess 50 will cause lever 116 to pivot in a clockwise direction about pin 120. Rotation of lever 116 will similarly cause rotation of lever 118, as spring 130 tends to hold abutment surface 124 and screw 126 in engagement. Rotation of lever 118 engages pin 115 with the cam surface 140 of lever 104 and pivots lever 104 about pin 108 so that the pin 180 is engaged with cam surface 184 of lever 102. Continued rotation of lever 116 by engagement of roller 122 with surface 214 thus causes clockwise rotation of levers 104 and 102 for the distance X, that is, until abutment surfaces 162 and 160 of stop members 110 and 164 are in engagement. At that point, clockwise rotation of levers 102 and 104 is prevented, as is clockwise rotation of lever 118, and continued outward movement of roller 122 and clockwise movement of lever 116 serves only to expand spring 130 and move abutment surfaces 124 and 126 away from each other. As roller 122 is engaged in recess 52, lever 116 is returned in a counterclockwise direction for a slight distance, to the position illustrated in FIG. 4. However, since the base **50*b* of recess 50 is deeper with respect to the peripheral surface of cam 44 than the base 52b of recess 52, or the base of either of recesses 48 and 54, abutment surface 124 and screw 126 will be held in spaced relationship with spring 130 in an expanded configuration. In this manner the force produced by spring 130, which force tends to urge lever 116 in a counterclockwise direction, is increased. The force produced by spring 130 in this configuration, which force urges roller 122 into recess 52, as seen in FIG. 4, is sufficient to overcome the force of spring 74 which urges lever 68 in a counterclockwise direction and roller 66 into engagement with the surface portion 60 of cam 44 and thus urges cam 44 to return to the position wherein roller 122 is engaged with recess 50. Thus, it is seen that cam 44 is held with roller 122 in recess 52 and dial 16 is held in the selected position which determines the desired operative mode of the device. It is noted that the force required to hold spring 130 in its expanded position is produced merely by the tension in tape 28, as the tape holds stop member 110 in its fixed position. This force corresponds to force $F_2$ in FIG. 5 and thus is substantially less than the force $F_1$ produced by spring 130** itself.

When tape 28 on supply reel 12 is depleted, the end thereof is released from the reel in a conventional manner and thus the tension on the tape passing head 30 is reduced and/or completely removed.

In the absence of tension on tape 28, lever 112 and bar 32 are moved to the dotted line positions illustrated in FIGS. 3 and 4. As a result, surface 160 of stop member 110 is moved out of engagement with surface 162 of lever 164 and the force $F_2$ applied to lever 102 is substantially reduced and/or eliminated.

Therefore, the force $F_1$ applied to lever 104 by pin 115 and spring 130 causes lever 104 to rotate about pin 108 and engagement of pin 180 with cam surface 184 causes rotation of lever 102 in a clockwise direction. Spring 130 is simultaneously free to move abutment surface 124 and screw 126 into engagement with each other as it urges lever 118 in a clockwise direction. As a result, spring 130 is contracted and the force applied by the spring to lever 116 urging roller 122 into engagement with recess 52, is substantially reduced. This force is sufficiently reduced so that the force applied by spring 74 to roller 66 is no longer overcome and the roller 66 moves along surface 60 towards concave portion 64 and rotates cam 44 in a counterclockwise direction to return roller 122 to recess 50.

As the roller 122 moves out of recess 52 along the surface 220 thereof, levers 116 and 118 are moved in a clockwise direction freeing pin 115 from surface 140 of lever 104 and causing the pin to move upwardly along the surface 222 of the latter. The movement of pin 115 along surface 222 causes continued clockwise rotation of levers 104 and 102 and therefore arm 163 of lever 164 is positioned adjacent and behind arm 161 of stop member 110. As cam 44 continues in rotation, roller 122 is returned to recess 50 under the influence of spring 142 which urges lever 118 in a counterclockwise direction. Due to the connection of levers 116 and 118 by spring 130, lever 116 is also moved in a counterclockwise direction and roller 122 is seated in recess 50. When levers 116 and 118 achieve their solid line positions illustrated in FIG. 3, levers 104 and 102 are free to rotate in a counterclockwise direction about their respective pivot points 106 and 108 under the influence of spring 176 and cam surface 140 of lever 104 is again engaged with pin 114.

As the lever 102 is moved in a counterclockwise direction, arm 163 of lever 164 engages arm 161 causing lever 164 to rotate about pin 166 until arm 163 is free of engagement with arm 161. Thereafter, spring 168 returns lever 164 to its solid line position. Thus, automatic control apparatus 40 is ready for the next operation of the device.

From the above description it is understood that the linkage systems described herein will operate similarly when dial 16 and cam 44 are rotated to the rewind and fast forward positions, that is, wherein roller 122 is engaged with recesses 48 and 54 respectively. Accordingly, further detailed description of the function of the apparatus in these positions in not believed necessary.

FIGS. 6 and 7 illustrate another embodiment of the present invention and elements of this embodiment which correspond to elements described above with respect to the embodiment of FIGS. 1–5 are designated by like numerals. In FIG. 6 automatic control apparatus 240 is shown in the configuration thereof when dial 16 is located at the stop position and the device 10 is in its stop mode, whereas FIG. 7 illustrates the configuration of the mechanism during recording and/or reproducing, with the tape engaging mechanism indicated in phantom lines at its second position in the device.

In this embodiment a cam 244 is rigidly mounted for rotation with shaft 42 and the cam has a plurality of recesses on the peripheral surface thereof which are selectively engaged by a latching mechanism 246 to determine the stop or operative mode of the device. Latch 246 selectively engages recesses 248, 250, 252 and 254, which recesses respectively correspond to the rewind, stop, record and fast forward positions of dial 16. Cam 244 includes a peripheral surface portion 258 which has two concave portions 260, 262, interconnected by a convex portion 264. A cam follower 266 is provided to engage cam surface 258 along the edge thereof and is mounted on a lever 268 which is pivotally mounted on pin 270. Lever 268 is biased in a clockwise direction by spring 274 operatively connected between the end 272 of lever 268 and an upstanding connecting member 276 secured to the base plate of the apparatus (not shown). As in the previously described embodiment, cam follower 266 is urged by spring 274 into contact with cam surface 258 and continuously urges cam 244 to the position wherein recess 250, corresponding to the stop mode of the device, is engaged by latching mechanism 246. In that case, cam follower 266 would be engaged in concave portion 264 of cam surface 258 and then would apply no rotational forces to the cam.

Latching mechanism 246 includes a pair of levers 278 and 280. Lever 278 is a generally L-shaped member pivotally mounted on pin 282 and having a leg 284 and a roller 286 mounted on the free end thereof. Lever 278 also includes a generally horizontally extending leg 288 and a generally downwardly extending abutment surface 290 which is adapted to engage a surface portion of lever 280. The latter is a generally U-shaped member pivotally mounted on pin 282 and has leg portions 292 and 294 respectively, and in addition has a generally horizontally extending member 296 extending in an opposite direction from legs 292 and 294.

Levers 278 and 280 are interconnected by a spring member 298 which urges lever 278 in a generally counterclockwise direction and lever 280 in a generally clockwise direction. However, engagement of extension 290 with the edge 300 of lever 280 limits the relative movement between the levers.

Tape engaging member 32 is secured to the free end 302 of lever 304 which is pivotally mounted on pin 306. Lever 304 includes an arm 308 on which is secured a downwardly extending roller or stop member 310 which is spaced from the surface 300 of lever 280 by a distance X when the device 10 is in its stop mode. Lever 304 is biased in a generally counterclockwise direction by spring 312 which is secured at one end to lever arm 308 and at its other end to a pin 314 on the base plate of the apparatus. As in the previously described embodiment, when tape 28 is moving between reels 12 and 14 under tension, the tape holds bar 32 and thus lever 304 in their first position, that is, the full line position illustrated in FIG. 6. However, when the tape is released from supply reel 12, the tension thereon is reduced, and lever 304 moves to its second position, indicated by phantom lines in FIG. 7, under the influence of spring 312 wherein further rotation thereof is prevented by stop pin 305.

After the tape 28 is threaded to reel 14 and engaged with bar 32, and as dial 16 and shaft 42 are rotated, as for example, to the record position thereof wherein latching mechanism 246 is engaged with recess 252, roller 286 is moved outwardly along the surface 316 of recess 250 and lever 278 is moved in a generally clockwise direction about pivot pin 282. As a result of the interconnection of levers 278 and 280 by spring 298, lever 280 is also moved in a generally clockwise direction about pivot pin 282 until the surface 300 thereof engages stop member 310; at this point further movement of lever 280 is prevented. However, continued rotation of cam 244 continues movement of roller 286 along surface 316 and the simultaneous clockwise rotation of lever 278.

As in the previously described embodiment, the depth of recess 252 is less than the depth of recess 250 with respect to the periphery of the cam surface, so that, when recess 252 is finally moved into position adjacent roller 286, the roller is moved into recess 252 but, as seen in FIG. 7, abutment surface 290 of lever 278 and surface 300 of lever 280 are in spaced relation and spring 298 is elongated to produce an increased biasing force on lever 278. This increased biasing force produced by spring 298 is sufficient to overcome the tendency of cam follower 266, under the influence of spring 274, to return the cam to a position wherein the latch mechanism is engaged with recess 250.

As the tape 28 runs out of supply reel 12 and the tension thereon is relaxed, lever 304 is moved to its second position by spring 312. As a result of the counterclockwise motion of lever 304, roller 310 is moved out of engagement with surface 300 of lever 280 and the latter is moved in a generally clockwise direction under the influence of spring 298 until the surface 300 thereof engages the abutment surface 290 of lever 278. At this point, spring 298 is contracted and the biasing force applied thereby is decreased and overcome by the force applied by spring 274 and roller 266 on cam surface 262, so that cam 244 is rotated in a generally counterclockwise direction to return recess 252 into engagement with roller 286.

In order to assist the return of roller 286 into engagement with recess 250, a generally L-shaped lever 316, pivotally mounted on shaft 270 with lever 286 is provided which lever includes an extension 318 having abutment surface 321. Lever 316 is interconnected with lever 268 by a spring 320, as seen in the drawings, and is also connected to extension 296 of lever 280 by spring 322.

When recording and/or reproducing device 10 is in the recording mode, that is, when roller 286 is engaged with recess 252, the abutment surface 321 of lever 316 is engaged with the surface 324 of extension 296. As roller 310 is released from surface 300, and lever 280 has moved in a clockwise direction so that surface 300 engages abutment 290, lever 316 rotates in a counterclockwise direction under the influence of spring 322 and the abutment surface 321 thereof is held in engagement with surface 324 of extension 296 by spring 322. Spring 322 thus applies a force to extension 296 to continue to urge lever 280 in a generally clockwise direction and simultaneously move lever 278 in a clockwise direction due to the interconnection of the latter with lever 280 by spring 298. In this manner, rotation of the latch mechanism 246 in a clockwise direction is initiated and assisted so as to move roller 286 out of recess 252 and facilitate return of cam 244 to a position wherein roller 286 is engaged with recess 250.

While the levers 190 and 200 described above with respect to automatic control apparatus 40 have not been illustrated in the drawings or described with respect to the present embodiment of the invention, it is noted that these levers may also be provided in this embodiment and would function in substantially the same manner. Accordingly, no further detailed description thereof is believed necessary.

It is thus seen that by the construction of the above described embodiments of the present invention, when the tape 28 contained on supply reel 12 runs out, and is released therefrom in the conventional manner, automatic control mechanisms 40 and 240 return the selector switch or dial 16 to its stop position wherein the device 10 is placed in its stop mode with the rotation of the reels by the motors connected thereto stopped and the device shut off.

Although illustrative embodiments of the present invention have been described herein with reference to the accompanying drawings, it is to be understood that the invention is not limited to those precise embodiments, and that various changes and modifications may be effected therein by one skilled in the art without departing from the scope or spirit of this invention.

What is claimed is:

1. A tape recording and reproducing device having magnetic head means for recording signals on and reproducing signals from a magnetic tape passing adjacent said head means in tension from a supply reel to a takeup reel and switch control means movable to a plurality of positions for selectively determining the stop and operating modes of said device, wherein the improvement comprises means yieldably urging said switch control means to the position thereof determining said stop mode, tape engaging means mounted on said device for movement between first and second positions thereof, means for biasing said tape engaging means towards said second position, said tape engaging means being held in said first position by said tape as the tape moves in tension past said head means and being moved towards said second position by said biasing means in the absence of tensioned tape engaged therewith, holding means adapted for selectively holding said switch control means at said positions of the latter determining said stop and operating modes of said device with a relatively great holding force when said switch control means is at any of said positions thereof determining said operating modes and with a substantially smaller holding force when said switch control means is at said position thereof determining said stop mode, and means operably engaged with said tape engaging means and said holding means for sufficiently increasing said holding force applied by said holding means when said tape engaging means is at said first position to overcome the force of said means urging the switch control means to said position determining the stop mode and thereby hold said switch control means at a position thereof corresponding to an operating mode of said device.

2. In a tape recording and reproducing device having magnetic head means for recording signals on and reproducing signals from a magnetic tape passing adjacent said head means in tension from a supply reel to a takeup reel and switch control means selectively movable to a plurality of positions for stopping said device and varying the operative modes thereof, apparatus for selectively maintaining said switch control means in each of said positions comprising, a cam member operably connected to said switch control means and having a plurality of recesses formed on the peripheral surface thereof, said recesses corresponding respectively to said switch control means positions, means for selectively engaging said cam recesses, first biasing means urging said selective engaging means into said recesses, said first biasing means being adapted to apply a greater force to said selective recess engaging means at the cam recesses corresponding to said operative modes than at the cam recess corresponding to the stop mode of said device, means engaging said cam member for urging said cam to a position wherein said selective engaging means is engaged with said cam recess corresponding to the stop mode of said device, tape engaging means mounted on said device for movement between first and second positions therein, second biasing means urging said tape engaging means towards said second position, said tape engaging means being held in said first position by said tape as the tape moves in tension past said head means and being moved towards said second position by said second biasing means in the absence of tensioned tape engaged therewith, and means operably engaged with said tape engaging means and said recess engaging means for increasing the force applied by said first biasing means when said tape engaging means is at said first position to overcome the force applied by said cam urging means and hold said recess engaging means in a predetermined recess in said cam corresponding to an operative mode of said device.

3. Apparatus as in claim 2 wherein said cam recess corresponding to said stop mode is deeper with respect to the surface of said cam than the remaining recesses thereon.

4. Apparatus as in claim 3 wherein said means operably engaged with said tape engaging means and said recess engaging means includes first and second pivotally mounted levers, having opposed abutment surfaces thereon, said first lever having said recess engaging means mounted thereon and said first biasing means being operably interconnected between said first and second levers for urging said abutment surfaces into engagement.

5. Apparatus as in claim 4 wherein said tape engaging means includes stop means thereon operably engaged with said second lever for holding said lever abutment means in spaced relation when said tape engaging means is in said first position whereby the force applied by said first biasing means to said first lever and said recess engaging means is increased.

6. Apparatus as in claim 5 wherein said stop means is in direct engagement with a surface portion of said second lever when said tape engaging means is in said first position.

7. In a tape recording and reproducing device having magnetic head means for recording signals on and reproducing signals from a magnetic tape passing adjacent said head means in tension from a supply reel to a takeup reel and switch control means selectively movable to a plurality of positions corresponding respectively to the stop and operating modes of said device, apparatus for selectively maintaining said switch control means in a respective one of said positions comprising, a cam member operably connected to said switch control means and having a plurality of recesses formed on the peripheral surface thereof, said recesses corresponding respectively to said switch control means positions, means for selectively engaging said cam recesses, means engaging said cam member for urging said cam to a position wherein said selective engaging means is engaged with the cam recess corresponding to the stop mode of said device, tape engaging means mounted on said device for movement between first and second positions therein, means biasing said tape engaging means towards said second position, said tape engaging means being held in said first position by said tape as the tape moves, in tension, past head means and being moved towards said second position by said biasing means in the absence of tensioned tape engaged therewith, and releasable lock means operably engaged between said selective engaging means and said tape engaging means for holding said selective engaging means in a predetermined cam recess corresponding to one of the operative modes of said device when said tape engaging means is in said first position, against the bias of said cam urging means and for releasing said selective engaging means when said tape engaging means is moved towards said second position whereby said cam is moved by said cam urging means to the position wherein said selective engaging means is engaged with the cam recess corresponding to the stop mode of the device.

8. Apparatus as in claim 7 wherein the cam recess corresponding to said stop mode is deeper with respect to the surface of the cam than the remaining recesses thereon.

9. Apparatus as in claim 8 wherein said means for selectively engaging said cam recesses includes first and second pivotally mounted levers, said levers having opposed abutment surfaces and tension means normally biasing said abutment surfaces into engagement, said first lever having a recess engaging member thereon adapted to be held in predetermined recess by said tension means, said tape engaging means having a stop means thereon operably engaged with said releasable lock means for holding said lever abutment means in spaced relation when said tape engaging means is in said first position whereby the tension produced by said abutment biasing means is increased to overcome the bias of said cam urging means and hold said recess engaging member in said predetermined recess.

10. Apparatus as in claim 9 wherein said releasable lock means comprises a pair of pivotally mounted levers, biasing means pivotally interconnecting said lock levers for urging said levers in a common rotational direction about their respective pivot points, one of said lock levers having a cam surface and an abutment member for operably engaging said stop means when said tape engaging means is in said first position and said recess engaging member is at said predetermined recess, the other of said lock levers having a cam surface and means thereon for engaging the cam surface of said one lock lever, and said second lever includes means for engaging the cam surface of said other lock lever, whereby, as said switch control means is moved from the position thereof corresponding to said stop mode to a position thereof corresponding to an operative mode of said apparatus, said first and second levers are pivoted as said recess engaging member is moved out of the stop mode recess to engage said second lever engaging means with the cam surface of said other lock lever and the engaging means of said other lock lever with the cam surface of said one lock lever thereby moving said levers in counterrotation to said lever biasing means to engage said one lock lever abutment means with said stop means and increase the tension produced by said abutment biasing means.

* * * * *